United States Patent
Vauchel et al.

(10) Patent No.: US 8,899,512 B2
(45) Date of Patent: Dec. 2, 2014

(54) ACOUSTIC ATTENUATION PANEL FOR AIRCRAFT FOR ENGINE NACELLE

(75) Inventors: Guy Bernard Vauchel, Harfleur (FR); Guillaume Ruckert, Fiquefleur-Equainville (FR)

(73) Assignee: Aircelle, Gonfreville L'Orcher (FR)

( * ) Notice: Subject to any disclaimer, the term of this patent is extended or adjusted under 35 U.S.C. 154(b) by 119 days.

(21) Appl. No.: 13/056,822

(22) PCT Filed: Jul. 28, 2009

(86) PCT No.: PCT/FR2009/000935
§ 371 (c)(1),
(2), (4) Date: Jan. 31, 2011

(87) PCT Pub. No.: WO2010/012900
PCT Pub. Date: Feb. 4, 2010

(65) Prior Publication Data
US 2011/0133025 A1 Jun. 9, 2011

(30) Foreign Application Priority Data

Jul. 30, 2008 (FR) .................................. 08 04348
Nov. 6, 2008 (FR) .................................. 08 06196
Dec. 22, 2008 (FR) .................................. 08 07351

(51) Int. Cl.
| | |
|---|---|
| B64C 1/40 | (2006.01) |
| B64D 15/00 | (2006.01) |
| F02K 1/82 | (2006.01) |
| F02C 7/045 | (2006.01) |
| F02C 7/24 | (2006.01) |
| F02C 7/047 | (2006.01) |
| B64D 33/02 | (2006.01) |

(52) U.S. Cl.
CPC ......... *F02C 7/045* (2013.01); *B64D 2033/0233* (2013.01); *B64D 33/02* (2013.01); *Y02T 50/672* (2013.01); *F02K 1/827* (2013.01); *F02C 7/24* (2013.01); *F02C 7/047* (2013.01); *B64D 2033/0286* (2013.01); *B64D 2033/0206* (2013.01); *F05D 2300/224* (2013.01); *F05D 2300/612* (2013.01)
USPC ...................................... 244/1 N; 244/134 R

(58) Field of Classification Search
USPC ....... 244/1 N, 53 R, 53 B, 134 R, 134 B, 133
See application file for complete search history.

(56) References Cited

U.S. PATENT DOCUMENTS 3,952,831 A * 4/1976 Bernard et al. ................ 181/292
4,550,798 A * 11/1985 Swartz et al. .................. 181/201

(Continued)

FOREIGN PATENT DOCUMENTS

| EP | 1391597 A2 | 2/2004 |
| FR | 2396868 | 2/1979 |
| WO | 0140414 A1 | 7/2001 |

OTHER PUBLICATIONS

International Search Report PCT/FR2009/000935.

*Primary Examiner* — Tien Dinh
*Assistant Examiner* — Michael Wang
(74) *Attorney, Agent, or Firm* — Brinks Gilson & Lione

(57) ABSTRACT

An aircraft turbojet engine air intake structure includes an air intake lip provided with a first acoustic attenuation panel which contains a structuring skin and, as an acoustic absorption material, a porous material fastened on the skin. The air intake structure also includes a pneumatic de-icing compartment defined by the lip and by an inner partition. The first acoustic attenuation panel is of the type including an open-cell porous material which is capable of resisting a temperature of up to 200° C. and having high heat conductivity.

12 Claims, 4 Drawing Sheets

(56) References Cited

U.S. PATENT DOCUMENTS

| | | | |
|---|---|---|---|
| 4,759,000 A * | 7/1988 | Reitz | 367/176 |
| 5,060,471 A | 10/1991 | Torkelson | |
| 6,182,787 B1 * | 2/2001 | Kraft et al. | 181/292 |
| 6,371,411 B1 * | 4/2002 | Breer et al. | 244/134 R |
| 6,871,822 B2 * | 3/2005 | Guard et al. | 244/131 |
| 6,935,834 B2 * | 8/2005 | Lata Perez | 415/115 |
| 7,291,815 B2 * | 11/2007 | Hubert et al. | 219/535 |
| 7,588,212 B2 * | 9/2009 | Moe et al. | 244/134 D |
| 7,923,668 B2 * | 4/2011 | Layland et al. | 219/535 |
| 2005/0183903 A1 | 8/2005 | Stevenson | |
| 2011/0011981 A1 * | 1/2011 | Vauchel et al. | 244/134 B |

\* cited by examiner

Fig. 1 bis

Fig. 1 ter

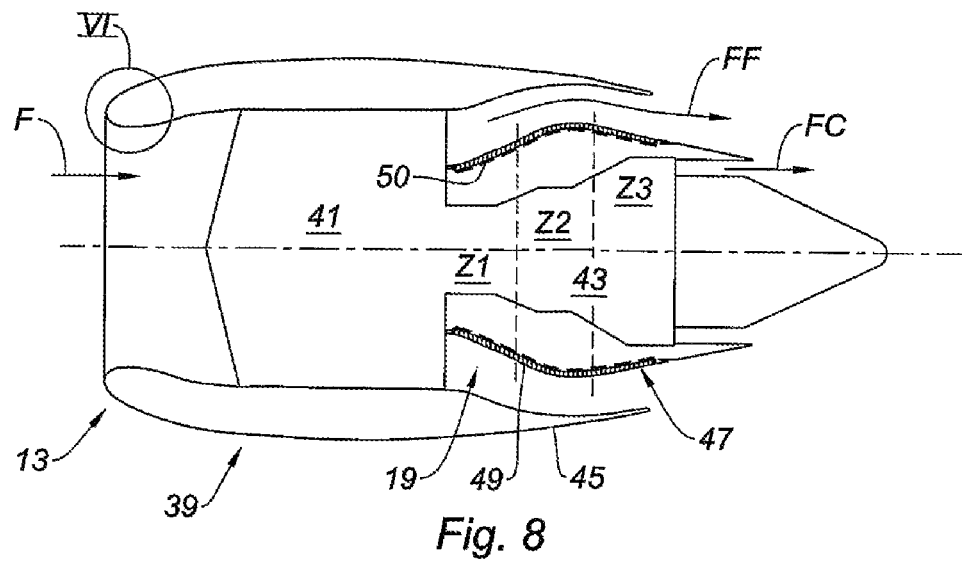
Fig. 8
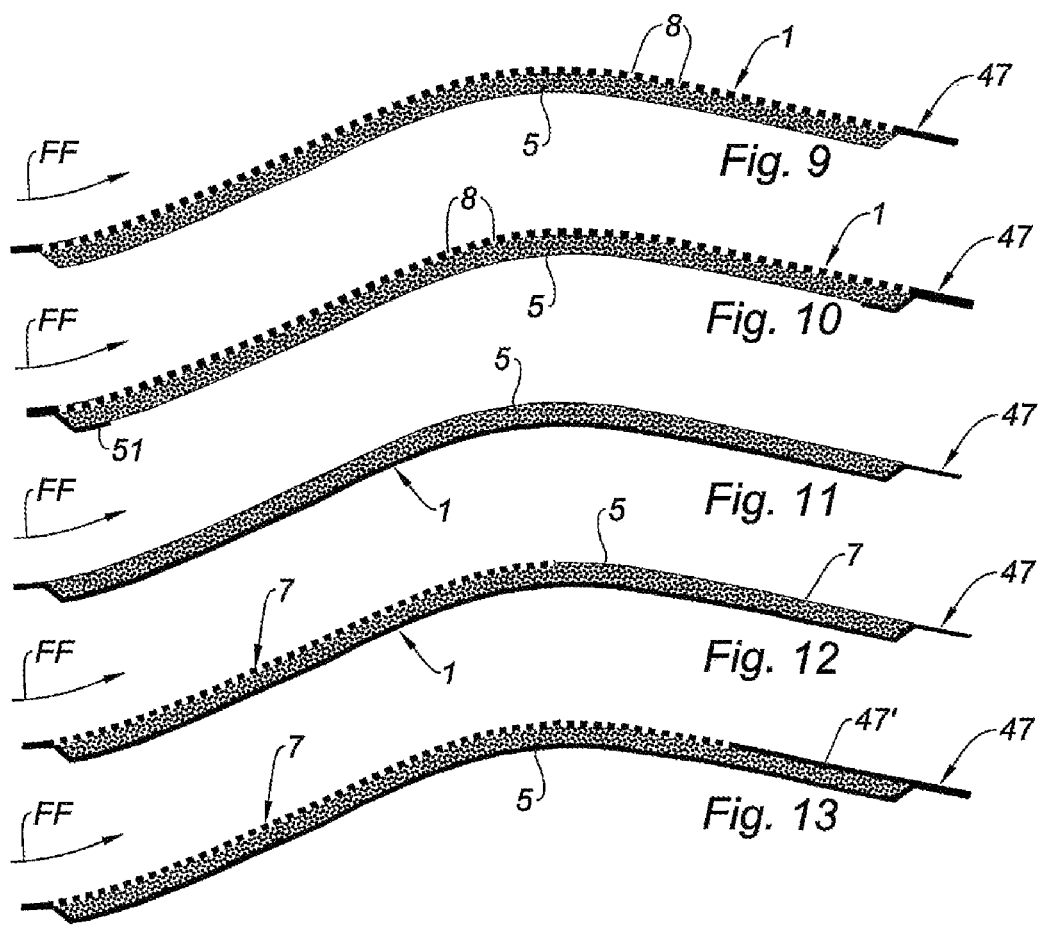
Fig. 9
Fig. 10
Fig. 11
Fig. 12
Fig. 13

ACOUSTIC ATTENUATION PANEL FOR AIRCRAFT FOR ENGINE NACELLE

TECHNICAL FIELD

The present invention concerns an acoustic attenuation panel for an aircraft engine nacelle, and nacelle elements equipped with such a panel.

BACKGROUND

The use of acoustic attenuation panels in aircraft engine nacelles to reduce noise emissions from turbojet engines is known from the prior art.

These acoustic attenuation panels generally have a sandwich structure comprising a structuring skin, a cellular honeycomb-type structure, and a resistive layer generally formed by a perforated skin.

The realization of these acoustic attenuation panels is costly in particular due to the presence of the cellular structure, and of the need to fasten said cellular structure on the structuring and perforated skins.

BRIEF SUMMARY

The present invention thus aims in particular to provide an acoustic attenuation skin with a simplified design in relation to the state of the art, that can be manufactured at a lower cost.

This aim of the invention is achieved with an acoustic attenuation panel for an aircraft engine nacelle comprising a structuring skin and, as acoustic absorption material, a porous material attached on said skin.

"Porous material" refers, in the context of the present invention, to an open material (i.e. having numerous communicating cavities) assuming the form of foam, or in expanded form, or in the form of an aggregate of small elements such as balls.

Due to its porous nature, such a material has good acoustic attenuation properties.

Such a material, formed from commercially available metal, polymer, ceramic or composite materials, generally has a much lower cost than that of a cellular structure, and its placement on the structuring skin is much simpler.

In certain cases, the acoustic attenuation panels must be designed to be installed in hot zones of the aircraft turbojet engine nacelle, and in particular in the lower portion of said nacelle through which exhaust gases are expelled whereof the temperature is typically greater than 600° C.

The use of acoustic attenuation panels in this exhaust zone makes it possible to substantially reduce the noise emissions situated in the high frequency range.

For these particular high-temperature applications, generally acoustic attenuation panels are used whereof the structuring skin is formed by a metal sheet, the cellular structure is metal, and the resistive layer is a perforated metal sheet.

The metal cellular structure is connected by brazing (i.e. by assembling two materials using a filling metal having a lower melting temperature than that of the base metal) to the structuring metal sheet and the perforated metal sheet.

The use of metal alloys for all of the elements making up said sandwich structure, and the implementation of brazing to connect them to each other, are particularly costly.

Moreover, the panel obtained from all of these metal element is relatively heavy.

The present invention therefore also more particularly aims to provide an acoustic attenuation panel adapted to be installed in a nacelle hot zone, that is less costly and heavy than those of the prior art.

This more particular aim of the invention is obtained with an acoustic panel of the aforementioned type, remarkable in that said porous material is chosen in the group comprising materials resisting temperatures of up to 200° C., material resisting temperatures up to 400° C., materials resisting temperatures up to 600° C., and materials resisting temperatures up to 800° C.

Depending on the applications anticipated in hot zones, the porous material may have more or less heat conductivity.

In the particular case where this panel is intended to equip the air intake lip of an air intake structure with pneumatic de-icing, the porous material will be chosen so as to resist a maximum temperature in the vicinity of 400° C., and to have high heat conductivity.

The material forming such a porous material intended for a hot zone may be chosen in the group comprising metal foams, and in particular foams with a base of alloys of aluminum and/or copper and/or nickel and/or chrome, or carbon foams.

According to other optional features of the acoustic attenuation panel according to the invention:
- said porous material is adhered to said structuring skin: this is a very simple means of fastening the porous material on the structuring skin;
- said structuring skin includes perforations: this arrangement is suitable when one wishes for the structuring skin to be arranged on the side of the flow of exhaust gases;
- stiffeners are fastened on said structuring skin: these stiffeners make it possible to give the panel a rigidity comparable to that procured by the cellular structure of the panels of the prior art;
- a resistive layer is attached on the stiffeners: this resistive layer makes it possible in particular to protect the porous material from impacts;
- this resistive layer is formed by a wire mesh or a perforated skin, or by a combination of those two elements;
- said structuring skin and/or said stiffeners and/or said perforated skin and/or said resistive layer are formed in material chosen from the group including metal alloys, ceramics, metal matrix composites, ceramic matrix composites: the choice of these materials is related to the weight and temperature constraints and to the mechanical stresses to which the acoustic panels must be subjected.

Another more particular aim of the present invention is to provide a panel whereof the characteristics completely meet the temperature, geometry, frequency and spatial distribution of noise emissions, etc. conditions under which it will be used ("custom" panel).

This more particular aim of the invention is achieved with a panel according to the preceding, wherein the porous material includes cavities: the presence of these cavities makes it possible to optimize the weight and sound absorption characteristics of the panel according to its intended use.

According to other optional features of this optimized panel, making it possible to adapt it perfectly as a function of its intended use:
- at least part of said cavities are through cavities;
- at least part of said cavities are blind cavities;
- at least part of said cavities have walls oriented substantially perpendicular to the middle plane of said panel;
- at least part of said cavities have walls that are inclined relative to the middle plane of said panel;
- said porous material is formed by a superposition of layers of porous materials with different characteristics, in the direction of the thickness of the panel;

said porous material is formed by a juxtaposition of blocks of porous materials with different characteristics, in the direction parallel to the middle plane of the panel.

The present invention also concerns an aircraft turbojet engine air intake structure, remarkable in that it includes an air intake lip provided with at least a first acoustic attenuation panel according to the preceding.

According to optional characteristics of this air intake structure:

said air intake structure comprises a pneumatic de-icing compartment defined in particular by said lip and by an inner partition, and said first acoustic attenuation panel is of the type comprising an open-cell porous material, capable of resisting a temperature of up to 400° C. and having high heat conductivity;

said first acoustic attenuation panel is fastened to the inside of said air intake lip by an upstream maintenance sheet and a downstream maintenance sheet, and said inner partition is fastened on said downstream maintenance sheet, preferably by riveting;

said air intake structure comprises a second acoustic attenuation panel fastened to the inside of the air intake lip downstream of said inner partition, separated from said first panel by a joint made of an open-cell porous material able to resist a temperature of up to 400° C. and having a low heat conductivity;

said second acoustic attenuation panel is chosen in the group comprising a panel with porous material and open cells according to the preceding, capable of resisting temperatures of up to 120° C., and a honeycomb structure panel;

said first panel, said joint made from porous material and said second panel are covered by a common sheet on which said inner partition is fastened, preferably by riveting;

said air intake structure is of the type wherein the air intake lip forms a single-piece assembly with the outer wall of the air intake structure, this single-piece assembly being able to slide relative to the fan case of the turbojet engine, as described for example in document FR 2 906 586;

said air intake structure comprises centering members fastened on said common sheet.

The present invention also concerns a inner fixed structure of an aircraft turbojet engine nacelle, remarkable in that it includes at least one acoustic attenuation panel according to the preceding.

According to optional features of this inner fixed structure:

said acoustic attenuation panel is situated at least partly in the zone of said inner fixed structure intended to be subjected to high temperatures created by said turbojet engine, and the porous material of said panel is of the open cell type and is able to resist a temperature of up to 800° C. and has high heat conductivity;

said porous material is found on the inner face of said inner fixed structure, the latter being provided with perforations on at least part of its surface covering said porous material;

said porous material is maintained by returns formed in said inner fixed structure;

said porous material is found on the outer face of said inner fixed structure, inside a withdrawn area formed inside said structure;

said porous material is covered, at least in the upstream portion, by a perforated resistive layer;

said resistive layer is formed in the same material as that of the inner fixed structure.

BRIEF DESCRIPTION OF THE DRAWINGS

The present invention also concerns an aircraft engine nacelle, remarkable in that it is equipped with at least one acoustic attenuation panel according to the preceding.

Other features and advantages of the present invention will appear in light of the following description, and upon examining the appended figures, where:

FIG. 8 illustrates, in diagrammatic longitudinal cross-section, a nacelle of the prior art, containing a traditional dual-flow turbojet engine, and FIGS. 9 to 13 illustrate, in partial cross-sectional view, different alternatives of a fixed internal nacelle structure, equipped with at least one acoustic attenuation penal according to the invention.

In all of these figures, similar or identical references designate similar or identical members or sets of members.

DETAILED DESCRIPTION

Figure 1:
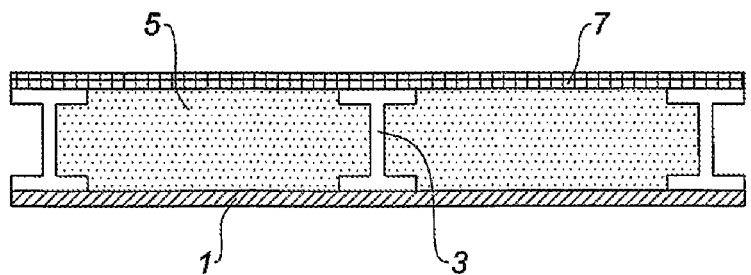
FIG. 1 is a diagrammatic and cross-sectional illustration of one embodiment of an acoustic panel according to the invention.

As shown in FIG. 1, an acoustic panel according to the invention includes, on the side opposite the origin of the sound excitation, a structuring skin 1, formed in a sheet.

On this structuring skin 1, a plurality of stiffeners 3 are attached that can for example be formed by beams having an i-shaped section, arranged parallel to each other.

Arranged between these stiffeners 3 is a porous material 5, i.e. a material having an open structure, i.e. open cells, able to absorb the energy from the acoustic waves.

This porous material, which can assume the form of a foam, or an expanded form, or the form of felt, or the form of an aggregate of small elements such as beads, can be fixed by adhesion or brazing on the structuring skin 1.

A resistive layer 7, formed by a perforated sheet or by a wire mesh, or by a combination of both elements, can be attached on the stiffeners 3, so as to encapsulate the porous material 5.

The stiffeners 3 can be fastened on the structuring skin 1 by brazing or riveting.

The resistive layer 7 can be fastened on the stiffeners 3 by adhesion, brazing or welding.

As previously indicated, the porous material 5 can be formed from commercially available metal, polymer, ceramic or composite materials.

The porous material 5 is chosen as a function of the usage conditions of the acoustic panel.

The table below provides, as an example, different types of foams that may be suitable as porous material for different usage conditions of the acoustic panel:

| Features | Nature of the foams | Examples of commercially available foams |
|---|---|---|
| Foams resistant to relatively high temperatures (up to 600° C. and beyond) | Nickel-chrome alloy-based foams-density of 0.6 to 0.65 g/cm3 | RECEMAT ®- marketed by the company RECEMAT INTERNATIONAL, or metal foams from the company FiberNide |
| | Carbon foam-can withstand beyond 600° C. | |
| Foam resistant to relatively low temperatures (up to 200° C.) | Aluminum-based foams-density from 0.2 to 0.4 g/cm3 | Foams by the company CYMAT |
| | Polymethacrylimide foam-density of 0.05 g/cm3 | ROHACELL ®- marketed by the company EMKAY PLASTICS |
| Foams having a relatively high thermal conductivity | Nickel-based foams-conductivity can reach 9 W/mK for a minimum porosity of 90% | |
| | Aluminum and copper alloy-based foams-conductivity can reach 10 W/mK for a minimum porosity of 65% | |
| | Carbon foam-conductivity can reach 25 W/mK for a minimum porosity of 78% | |
| Foams having a relatively low thermal conductivity | Ceramic foam-conductivity from 0.01 to 1 W/mK for a density from 0.02 to 0.4 g/cm3 | |
| | Polymethacrylimide foam-conductivity of 0.031 W/mK for a density of 0.032 g/cm3 | ROHACELL 31 ® marketed by the company EMKAY PLASTICS |

In the particular case where the acoustic attenuation panel is intended to be installed in high temperature zones of an aircraft nacelle (in particular in the expulsion zone of the exhaust gases of the turbojet engine), it is provided that the porous material 5 is formed in a material able to withstand temperatures of up to 800° C.: carbon foam may be suitable, for example. Concerning the materials used for the other elements of the acoustic attenuation panel, i.e. the structuring skin 1, the stiffeners 3 and the resistive layer 7, the choice will be made as a function of the weight, temperature and mechanical stress constraints.

As previously indicated, these materials may be chosen among metal alloys, ceramics, metal matrix composites (MMC) and ceramic matrix composites (CMC).

The operating mode of the advantages of the acoustic attenuation panel just described result directly from the preceding explanations.

The structuring skin 1 is fastened against a wall of a nacelle element, such as an exhaust gas jet nozzle.

The resistive layer 7 is thus exposed to the sound excitation whereof one is seeking to reduce the intensity.

The acoustic waves emitted by this sound source pass through the resistive layer 7 and penetrate the inside of the cavities of the porous material 5, which causes the reduction of the energy of said acoustic waves.

Several panels similar to that shown in the attached figure can be assembled edge to edge so as to cover the desired area.

It is understood that the implementation of the porous material 5 between the structuring 1 and perforated 7 skins is much simpler and therefore less costly than the implementation of a cellular structure.

This is particularly true in the case of an acoustic attenuation panel intended to be used in a high temperature zone: where it used to be necessary to use a metal cellular structure fastened by brazing on a structuring skin and metal resistive layer, a simple placement of the porous material 5 between the two skins makes it possible to achieve the desired result.

It will also be noted that the use of a porous material 5 that is commonly commercially available in itself makes it possible to reduce the manufacturing costs relative to the use of a cellular structure of the honeycomb type.

It will also be noted that the use of a porous material in general makes it possible to obtain a substantial weight reduction relative to the use of a cellular structure, in particular when the latter is metal for high temperature applications.

Of course, the invention is in no way limited to the embodiment just described.

For example, one could consider an extremely simplified structure, not comprising stiffeners 3 or a resistive layer 7: such a structure would therefore be formed solely by adhering a layer of porous material 5 on the structuring skin 1, as illustrated in FIG. 1bis.

One could consider placing the structuring skin 1 on the side of the flow F of exhaust gases, in which case this skin would include perforations allowing acoustic absorption, as shown in FIG. 1 ter.

In another simplified embodiment, stiffeners 3 could be provided without a resistive layer 7: such a structure would therefore be formed solely by the structuring skin 1 on which the stiffeners 3 would be attached and between which strips of porous material 5 fastened on the skin 1 by adhesion would be arranged.

It will, however, be noted that these simplified structures would not benefit from the protective function regarding mechanical impacts provided by the resistive layer 7.

It is thus also possible to consider that the porous material 5 could not be homogenous, but on the contrary could have zones with different acoustic absorption characteristics.

These different zones could be zones with an absence of porous material (cavities), and/or zones with porous materials of different natures (different foam densities).

Such a heterogeneity of the porous material 5 can be obtained by superposition of layers of different porous materials in the thickness of the panel, and/or by juxtaposition of blocks of porous materials in the direction of the middle plane of the panel.

Such a heterogeneity of the porous material 5 makes it possible to produce a customized acoustic absorption panel, i.e. completely suited to the conditions (geometry, temperature, nature of the noise emissions, weight constraints . . . ) under which it is intended to be used.

As a non-limiting example, FIGS. 2 to 5 show different considered alternatives of a panel with heterogeneous porous material layers.

Figure 2:
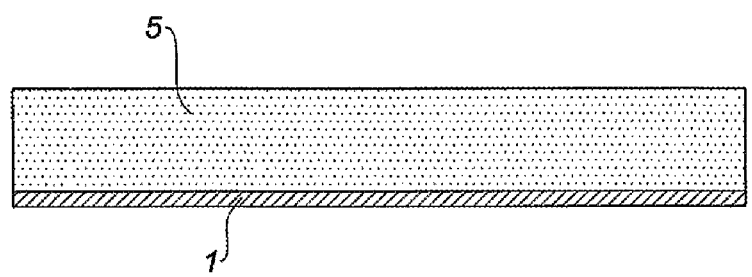
FIGS. 2 to 5 illustrate optimized alternatives of the acoustic panel of FIG. 1.
Figure 2:
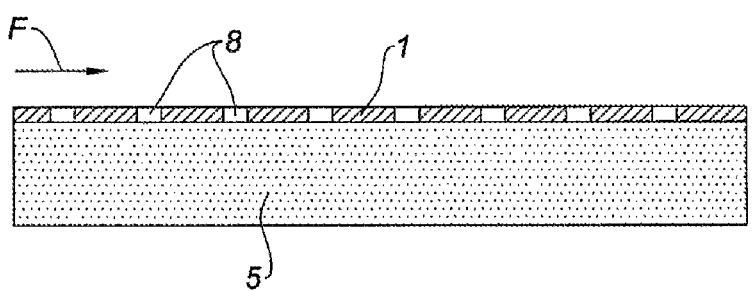
Figure 2:
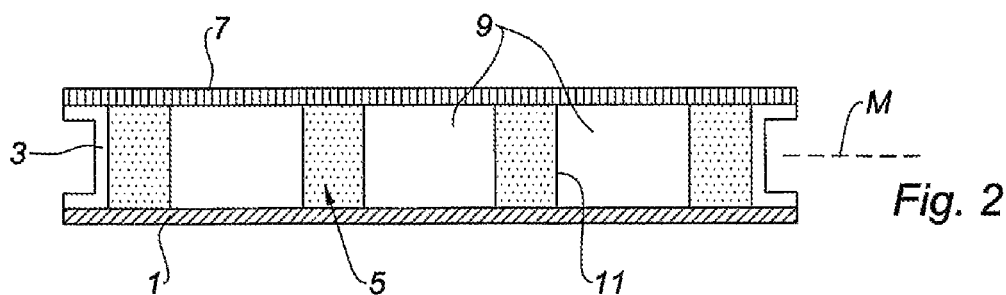

In the example of FIG. 2, the layer of porous material 5 is provided with through cavities 9, the walls 11 of those cavities being substantially perpendicular to the middle plane M of the acoustic panel.

These cavities 9 can be made by perforation of the porous material 5, or by arrangement of blocks of porous materials at regular or irregular intervals.

It should be noted that these cavities 9 can be of any shape: these cavities can be cylindrical, parallelepiped, or can even have an evolving section in the thickness of the panel.

Figure 3:
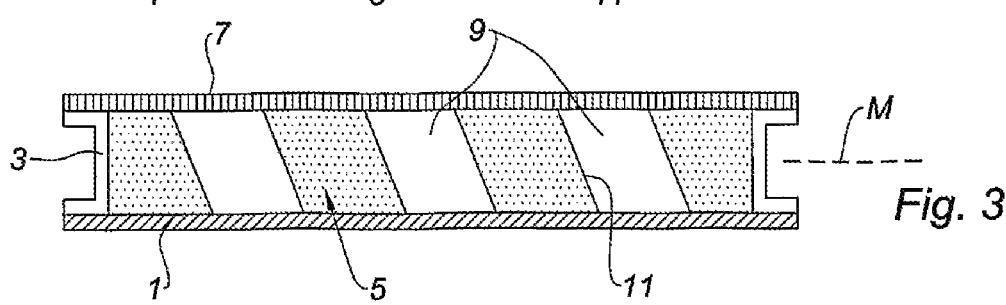

In the alternative of FIG. 3, the walls 11 of the cavities 9 are inclined relative to the middle plane M of the panel.

Figures 4, 5:
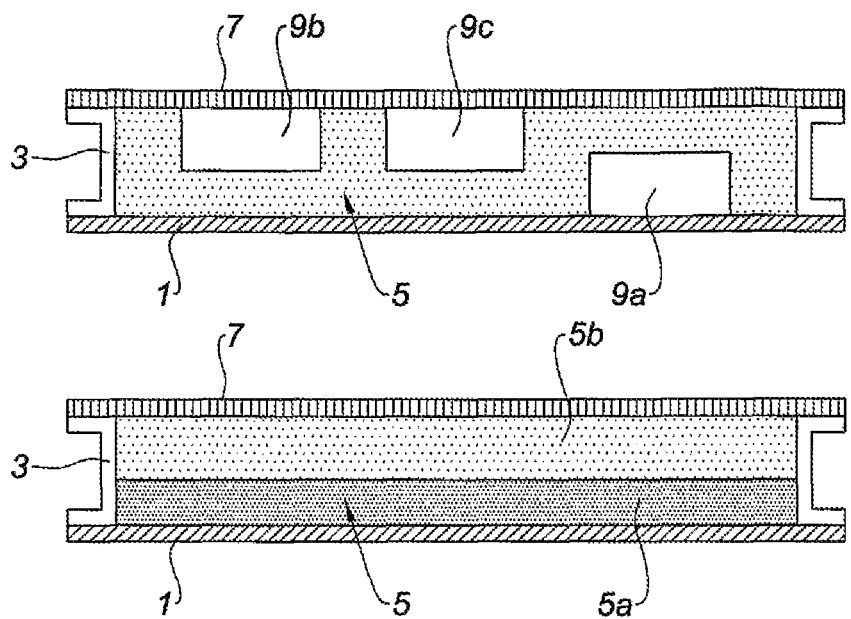

In the alternative of FIG. 4, the cavities 9 are blind, i.e. they only emerge on one side of the panel: on the side of the structuring skin 1 (cavities 9a) or the resistive layer 7 (cavities 9b, 9c).

In the alternative of FIG. 5, the layer of porous material 5 is in fact formed by a superposition of layers of porous materials 5a, 5b with different characteristics, in the direction of the thickness of the panel.

It should be noted that the number of superimposed layers is not limited, and that each layer can itself be made up of several densities of foams, in order to achieve a distributed treatment.

In one particular alternative (not shown), one can consider placing an intermediate layer (full or recessed) between the two attenuating layers 5a, 5b, to serve as septum or wedges so as to control the play of those layers 5a, 5b with the structuring skin 1 and the resistive layer 7, respectively.

Two examples of applications of the panels according to the preceding will now be described.

In these examples, the panels are placed in relatively hot areas: temperatures can reach up to 400° C. in the first example, and up to 800° C. in the second.

Figure 6:
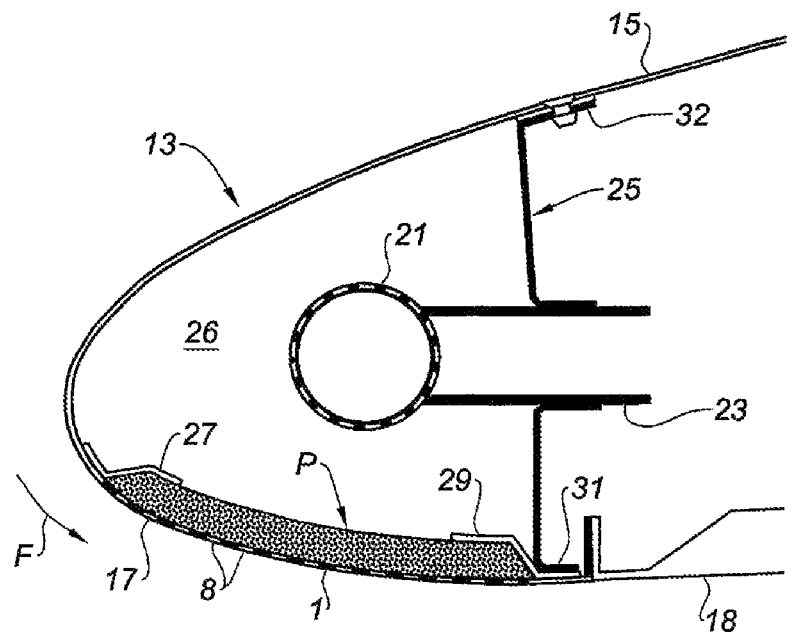
FIGS. 6 and 7 illustrate, in diagrammatic longitudinal cross-section, two alternatives of a nacelle air intake incorporating at least one acoustic attenuation panel according to the invention.

FIG. 6 shows an air intake structure of an aircraft turbojet engine nacelle, corresponding to zone VI of FIG. 8.

As is known in itself, such an air intake structure 13 includes an outer panel 15, i.e. situated at the outer periphery of the nacelle, as well as an air intake lip 17, forming the leading edge of the nacelle, and situated in the extension of an annular inner portion 18, often called "shroud," said shroud being able to have acoustic absorption properties.

In an operating situation, the flow of air F runs along the lip 17 and the shroud 18 before passing inside the engine 19 (see FIG. 8) arranged inside the nacelle.

In the following, the terms "upstream" and "downstream" must be understood in reference to the circulation direction of the air, as indicated by arrow F.

The air intake structure 13 can be of the type in which the air intake lip 17 and the external panel 15 form a single-piece assembly, able to slide relative to the shroud 18 during maintenance operations, as taught for example in document FR 2 906 568: in this case the structure is commonly called "laminar forward cowl" (LFC).

It will, however, be noted that the invention is in no way limited to this particular type of air intake structure.

Inside the air intake lip 17 is a hot air manifold 21 with a substantially annular shape, fed by at least one hot air feed pipe 23, which itself is connected with the hot zones of the engine 19.

The hot air distributed by the manifold 21 inside the air intake lip 17 makes it possible to de-ice said lip.

An inner partition 25 makes it possible to close the de-icing compartment 25, and thus to prevent hot air from escaping into other zones of the air intake structure.

With the aim of reducing the noise emissions from the nacelle, the air intake lip 17 is equipped with an acoustic attenuation panel P according to the preceding.

More precisely, the skin of the lip 17 forms the structuring skin 1 of said panel P, which is provided with perforations 8.

Inside said structuring skin 1 is the porous material 5, fastened by an upstream maintenance sheet 17 and by a downstream maintenance sheet 29.

The inner partition 25 includes a return 31, which is preferably riveted to the downstream sheet 29.

At its other end 32, the inner partition 25 is riveted to the inside of the outer panel 15.

Given the high temperatures reigning inside the de-icing compartment, the porous material of the acoustic attenuation panel P is chosen so as to be able to resist temperatures of up to 400° C.

One will also make sure that this porous material has high heat conductivity, so as to allow the heat from the hot air situated inside the de-icing compartment 26 to radiate to the surface of the air intake lip 17, thereby enabling effective de-icing.

Figure 7:
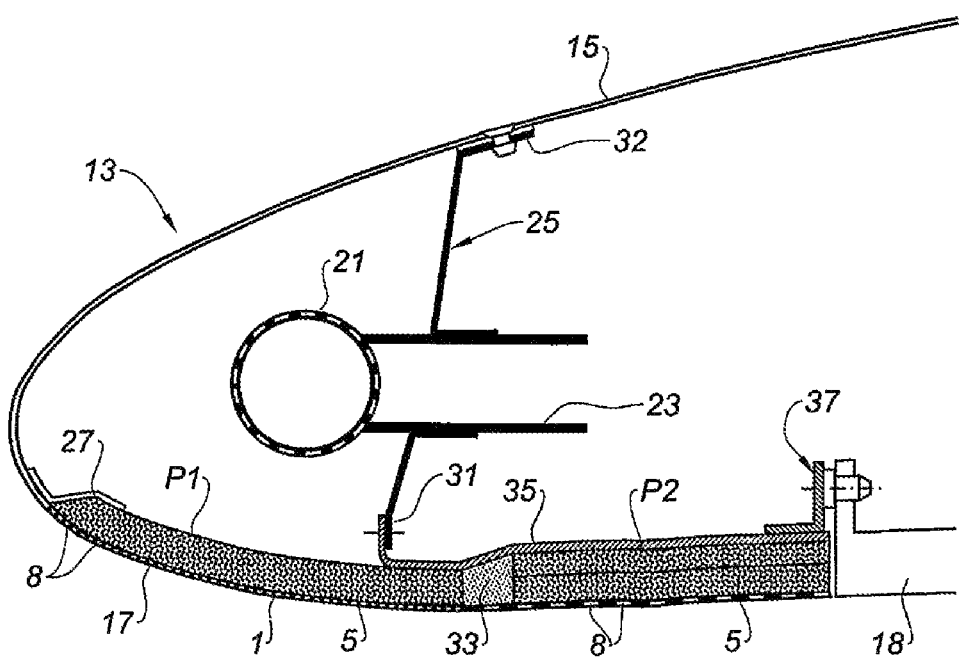

In the alternative illustrated in FIG. 7, there is a panel P1 similar to the panel P of the alternative of FIG. 6, downstream from which is a panel P2 according to the invention, and the porous material 5 of which is chosen so as to resist a temperature of up to 120° C.

Between these two panels P1 and P2 is a substantially annular joint 33, preferably formed in a porous material able to withstand temperatures of up to 400° C.

As shown in FIG. 7, the joint 33 and the acoustic attenuation panel P2 are situated downstream of the inner partition 25. More precisely, a sheet 35 can cover the downstream portion of the panel P1, the joint 33 and the panel P2, the return 31 of the inner partition 25 preferably being fastened by riveting on the downstream portion of the sheet 35.

In the specific case where the air intake structure 13 is of the aforementioned "LFC" type, centering members 37 can be provided fastened on the sheet 35, making it possible to center the air intake structure 13 relative to the shroud 18.

As in the case of FIG. 6, the skin of the air intake lip 17 forms the structuring skin of the panels P1 and P2, this structuring skin being provided with perforations 8.

Of course, different acoustic properties can be chosen for each of the panels P1 and P2, and all of the panels P, P1, P2 can be formed according to the precepts of the embodiments of FIGS. 2 to 5 in particular (porous material formed by the juxtaposition and/or superposition of blocks of foam, possibly provided with cavities).

Of course, it is also possible to consider replacing the acoustic attenuation skin P2 made from porous material according to the invention with a traditional acoustic attenuation panel, of the type comprising a honeycomb structure: the zone in which the panel P2 is located being much less hot than the zone in which the panel P1 is located, the use of a traditional acoustic attenuation panel is indeed possible.

It will also be noted that preferably, a porous material having low heat conductivity will be chosen for the joint 33, so as to correctly insulate the panel P2 relative to the panel P1: a ceramic foam could be suitable for that joint, for example.

We will now refer to FIGS. 8 to 13, in which we have illustrated a second embodiment of an acoustic panel according to the invention.

FIG. 8 shows a nacelle 39 of the prior art, surrounding a turbofan whereof the engine 19 is particularly visible.

As known in itself, the air intake structure 13 of said nacelle makes it possible to capture a flow of air F coming from the outside, which passes inside the fan of the turbojet engine and divides into a cold air flow FF circulating at the periphery of the engine 19, and a hot air flow FC circulating inside said engine.

More precisely, the circulating stream of the cold flow FF is defined on one hand by an outer structure 45 of the nacelle 39, and on the other hand by an inner fixed structure (IFS) 47, which makes up the fairing of the engine 19.

In order to reduce the noise emissions inherent to the circulation of this cold flow, acoustic attenuation panels 49 are traditionally placed at the periphery of the inner fixed structure 47.

These traditional acoustic panels 49 are generally of the honeycomb structure type, and to prevent them from being destroyed by the heat emitted by the engine 19, traditionally thermal protective pads 50 are used that are placed on the inner face of the acoustic panels 49, i.e. on the face of those acoustic panels opposite the engine 19.

Indeed, in zones Z1, Z2, Z3 illustrated in FIG. 8, typically corresponding to the compression, combustion and expansion zones of the engine 19, the temperatures can typically and respectively be between 120 and 150° C., 150 and 400° C., and 400 and 800° C.

Under these conditions, the use of an acoustic attenuation panel according to the invention, with a porous material capable of withstanding high temperatures, i.e. up to 800° C., is particularly indicated.

FIGS. 9 to 13 show different ways to integrate one or several acoustic attenuation panels according to the invention into the inner fixed structure 47, the latter part generally being made of a composite material, typically carbon fiber-based.

In the alternative illustrated in FIG. 9, the wall of the inner fixed structure 47 includes perforations 8, and a porous material 5 adapted to high temperatures, i.e. up to 800° C., is fixed on the inner face of the inner fixed structure 47, i.e. on the face of said inner structure opposite the engine 43.

In the alternative illustrated in FIG. 10, the porous material 5 is maintained by an upstream return and by a downstream return 53, preferably made of the same material as the wall of the inner fixed structure 47.

In the alternative of FIG. 11, the wall of the inner fixed structure 47 defines a withdrawn zone 1, inside which the porous material 5 is found, which is therefore directly exposed to the circulation of the cold flow FF (see FIG. 8).

The alternative of FIG. 12 differs from that of FIG. 11 in that a resistive layer 7 of the type indicated above covers the porous material 5 in the zone of the inner fixed structure 47 most exposed to the erosion caused by the circulation of the cold flow FF, i.e. in this case in the upstream zone of said porous material.

In the alternative illustrated in FIG. 13, the downstream portion of the porous material 5 is partly covered by a protrusion 47' of the wall forming the inner fixed structure 47.

For this particular embodiment of an acoustic attenuation panel according to the invention, a porous material 5 will be chosen having good heat conductivity, so as to allow the heat emitted by the engine 19 to escape towards the cold flow FF.

The invention claimed is:

1. An air intake structure for an aircraft turbojet engine, the air intake structure comprising:
    an air intake lip provided with at least a first acoustic attenuation panel comprising a structuring skin and, as acoustic absorption material, a porous material fastened on said skin,
    wherein the air intake structure comprises a pneumatic de-icing compartment defined in particular by said lip and by an inner partition, said inner partition closing said pneumatic de-icing compartment and comprising a return being fastened on a common sheet, and said first acoustic attenuation panel is an open-cell porous material capable of resisting a temperature of up to 200° C. and having high heat conductivity,
    wherein a centering member directly connected to a shroud is fastened on the common sheet partially covering said first acoustic attenuation panel on an opposite side to said structuring skin.

2. The panel according to claim 1, wherein the material forming said porous material comprises at least one of:
    a porous material formed by a superposition of layers of porous materials with different characteristics, in the direction of the thickness of the panel, and
    a porous material formed by a juxtaposition of blocks of porous materials with different characteristics, in the direction parallel to the middle plane of the panel.

3. The panel according to claim 1, wherein said porous material includes cavities comprising through cavities and blind cavities, wherein said cavities comprise cavities with walls oriented substantially perpendicular to the middle plane of said panel and cavities with walls that are inclined relative to the middle plane of said panel.

4. The panel according to claim 1, wherein said structuring skin includes perforations.

5. The air intake structure according to claim 1, further comprising stiffeners being fastened on said structuring skin.

6. The air intake structure according to claim 5, comprising a resistive layer attached on the stiffeners, wherein said resistive layer comprises a wire mesh or a perforated skin, or by a combination of those two elements,
    wherein said structuring skin and/or said stiffeners and/or said resistive layer are formed in material comprising at least one of metal alloys, ceramics, metal matrix composites, ceramic matrix composites.

7. The air intake structure according to claim 1, wherein said first acoustic attenuation panel is fastened to an inside of said air intake lip by an upstream maintenance sheet and a downstream maintenance sheet, and said inner partition is fastened on said downstream maintenance sheet.

8. The air intake structure according to 1, further comprising a second acoustic attenuation panel fastened to an inside of the air intake lip downstream of said inner partition, separated from said first panel by a joint made of an open-cell porous material able to resist a temperature of up to 400° C. and having a low heat conductivity.

9. The air intake structure according to claim 8, wherein said second acoustic attenuation panel is chosen in the group comprising a panel with porous material and open cells, capable of resisting temperatures of up to 120° C., and a honeycomb structure panel.

10. The air intake structure according to claim 8, wherein said first panel, said joint made from porous material and said second panel are covered by the common sheet.

11. The air intake structure according to claim 1, wherein the air intake lip forms a single-piece assembly with an outer wall of the air intake structure, said single-piece assembly being able to slide relative to a fan case of the turbojet engine.

12. The air intake structure according to claim 1, wherein the structure of said porous material is chosen from the group comprising foams, expanded materials, felts, aggregates of small elements, and the material forming said porous material is chosen from the group comprising metal, polymer, ceramic, composite materials, and carbon foam, said material being itself chosen from the group comprising materials resisting temperatures of up to 200° C., materials resisting temperatures up to 400° C., materials resisting temperatures up to 600° C., and materials resisting temperatures up to 800° C.

* * * * *